(12) United States Patent
Kim et al.

(10) Patent No.: US 9,564,663 B2
(45) Date of Patent: Feb. 7, 2017

(54) BATTERY MODULE AND BATTERY ASSEMBLY COMPRISING THE SAME

(71) Applicant: LG CHEM, LTD., Seoul (KR)

(72) Inventors: SeongTae Kim, Incheon (KR); Jin Kyu Lee, Daejeon (KR); JunSeok Choi, Daejeon (KR); TaeHyuck Kim, Daejeon (KR); TaeHwan Roh, Daejeon (KR); DalMo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 380 days.

(21) Appl. No.: 14/092,674

(22) Filed: Nov. 27, 2013

(65) Prior Publication Data

US 2014/0087221 A1    Mar. 27, 2014

Related U.S. Application Data

(63) Continuation of application No. PCT/KR2012/004850, filed on Jun. 20, 2012.

(30) Foreign Application Priority Data

| Jun. 27, 2011 | (KR) | 10-2011-0062079 |
| Jun. 28, 2011 | (KR) | 10-2011-0062923 |
| Jun. 29, 2011 | (KR) | 10-2011-0063908 |

(51) Int. Cl.
  *H01M 10/48* (2006.01)
  *H01M 2/10* (2006.01)
  (Continued)

(52) U.S. Cl.
  CPC ......... *H01M 10/482* (2013.01); *H01M 2/1077* (2013.01); *H01M 2/206* (2013.01); *H01M 10/6556* (2015.04)

(58) Field of Classification Search
  None
  See application file for complete search history.

(56) References Cited

U.S. PATENT DOCUMENTS

2005/0146825 A1 * 7/2005 Kaszeta ............. H01M 2/1077
                                                361/103
2007/0238018 A1   10/2007 Lee et al.
(Continued)

FOREIGN PATENT DOCUMENTS

| CN | 101395737 A | 3/2009 |
| JP | 2006-156090 A | 6/2006 |

(Continued)

OTHER PUBLICATIONS

International Search Report, issued in PCT/KR2012/004850, dated Jan. 2, 2013.

*Primary Examiner* — Miriam Stagg
*Assistant Examiner* — Wojciech Haske
(74) *Attorney, Agent, or Firm* — Birch, Stewart, Kolasch & Birch, LLP

(57) ABSTRACT

A battery module including a unit cell assembly including two or more battery cells or unit modules; a left case coupled to a left side of the assembly, the left case provided at a left outer side thereof with a first fastening groove extending parallel to a longitudinal direction of the battery module such that a sensing assembly is fastened into the first groove, the left case being provided at opposite ends thereof with second fastening grooves formed parallel to a height direction of the battery; and a right case coupled to a right side of the assembly, an external input and output terminal oriented to a front of the battery, the right case provided at a right inner side thereof with a plurality of fixing grooves formed parallel to a longitudinal direction of the assembly such that the assembly is fastened and fixed into the fixing grooves is provided.

9 Claims, 6 Drawing Sheets

(51) Int. Cl.
*H01M 2/20* (2006.01)
*H01M 10/6556* (2014.01)

(56) References Cited

U.S. PATENT DOCUMENTS

| | | | |
|---|---|---|---|
| 2009/0104512 A1* | 4/2009 | Fassnacht | H01M 2/0245 429/120 |
| 2009/0214936 A1* | 8/2009 | Yang | G01R 31/3696 429/61 |
| 2010/0021802 A1 | 1/2010 | Yang et al. | |
| 2010/0151299 A1 | 6/2010 | Ha et al. | |
| 2011/0059342 A1 | 3/2011 | Lee et al. | |
| 2011/0070474 A1 | 3/2011 | Lee et al. | |

FOREIGN PATENT DOCUMENTS

| | | |
|---|---|---|
| JP | 2010-503970 A | 2/2010 |
| KR | 10-2007-0100555 A | 10/2007 |
| KR | 10-2008-0025429 A | 3/2008 |
| KR | 10-2008-0027504 A | 3/2008 |
| KR | 10-0896131 B1 | 5/2009 |

* cited by examiner

BATTERY MODULE AND BATTERY ASSEMBLY COMPRISING THE SAME

CROSS REFERENCE TO RELATED APPLICATIONS

This application is a Continuation of PCT International Application No. PCT/KR2012/004850 filed on Jun. 20, 2012, which claims priority under 35 U.S.C. §119(a) to Patent Application Nos. 10-2011-0062079, 10-2011-0062923, 10-2011-0063908 filed in the Republic of Korea on Jun. 27, 2011, Jun. 28, 2011, and Jun. 29, 2011, respectively, all of which are hereby expressly incorporated by reference into the present application.

TECHNICAL FIELD

The present invention relates to a battery module and a battery assembly including the same and, more particularly, to a battery module including (a) a unit cell assembly including two or more battery cells or unit modules connected to each other in parallel or in series, (b) a left case coupled to a left side of the unit cell assembly, the left case being provided at a left outer side thereof with a first fastening groove extending parallel to a longitudinal direction of the battery module such that a sensing assembly is fastened into the first fastening groove, the left case being provided at opposite ends thereof with second fastening grooves formed parallel to a height direction of the battery module, and (c) a right case coupled to a right side of the unit cell assembly, an external input and output terminal being oriented to a front of the battery module, the right case being provided at a right inner side thereof with a plurality of fixing grooves formed parallel to a longitudinal direction of the unit cell assembly such that the unit cell assembly is fastened and fixed into the fixing grooves.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high power and large capacity are necessary for the middle or large-sized devices.

Preferably, a middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

Meanwhile, in order for the middle or large-sized battery module to provide power and capacity required by a specific apparatus or device, it is necessary for the middle or large-sized battery module to be configured to have a structure in which a plurality of battery cells is electrically connected to each other in series and the battery cells are stable against external force.

Consequently, in a case in which a middle or large-sized battery module is configured using a plurality of battery cells, a plurality of members for mechanical fastening and electrical connection between the battery cells is generally needed and, as a result, a process for assembling the mechanical fastening and electrical connection members is very complicated. Furthermore, there is needed a space for coupling, welding, or soldering the mechanical fastening and electrical connection members with the result that the total size of the system is increased. The increase in size of the system is not preferred in the aspect of the spatial limit of an apparatus or device in which the middle or large-sized battery module is installed. Moreover, the middle or large-sized battery module must be configured to have a more compact structure such that the middle or large-sized battery module can be effectively installed in a limited inner space, such as a vehicle.

In addition, the battery cells constituting the middle or large-sized battery module may be secondary batteries which can be charged and discharged. Consequently, a large amount of heat is generated from the battery cells during operation of the battery cells. If the heat, generated from the battery cells, is not effectively removed therefrom, deterioration of the battery cells is accelerated. According to circumstances, the battery cells may catch fire or explode. For this reason, it is required to efficiently dissipate heat from the battery cells. To this end, it is necessary to provide a flow channel. However, such a flow channel increases the size of the battery module.

In relation to this issue, structures of some conventional middle or large-sized battery modules will hereinafter be described.

Japanese Registered Patent No. 3355958 discloses a middle- or large-sized battery module including a plurality of battery cells stacked in a limited space, such as a vehicle, configured to have a structure in which protrusions defining a coolant flow channel are formed at the outside of each battery cell, such that a coolant cools the battery cells while the coolant passes through each stacked battery group after the coolant is introduced into gaps defined between the battery groups, in order to prevent reduction in cooling efficiency of the coolant which may be caused when, in a state in which the temperature of the coolant increases as the coolant passes through one stacked battery group, the coolant passes through another stacked battery group. The battery cells used in this patent are alkaline batteries such as nickel-metal hydride batteries. External shapes of the alkaline batteries exhibit high mechanical strength. Consequently, plates are disposed at opposite sides of a stack constituted by a plurality of battery cells and the plates are fixed by bands to configure a middle or large-sized battery module.

The battery cells disposed in the above patent has an advantage in that the battery cells can be easily stacked due in terms of external shapes thereof in addition to the structural characteristics to improve cooling efficiency. However, the battery cells disposed in the above patent has a disadvantage in that the battery cells have large volume and weight due to external shapes to provide high mechanical strength.

In addition, Japanese Patent Application Publication No. 2005-050616 discloses a middle or large-sized battery module installed in a large-sized vehicle, such as a bus, configured to have a structure in which the battery module includes a lower rack in which two battery packs are disposed and an upper rack in which two battery packs are disposed, a stand member of the lower rack and a stand member of the upper rack are suspended from a body of the vehicle via a suspension member of the lower rack and a suspension member of the upper rack, the stand members exhibit high strength, and the suspension members exhibit low strength, thereby improving safety of the battery module against external force applied to the battery module due to a vehicle crash.

In the above-described middle or large-sized battery module, a plurality of racks is used to improve safety of the vehicle when a vehicle crash occurs. However, two complicated racks are provided to install a total of four battery packs with the result that volume and weight of the battery module are increased. Consequently, it is technically difficult to configure the battery module such that the battery module has a compact structure.

Meanwhile, a battery module assembly is a structural body constituted by combining a plurality of battery cells and, therefore, safety and operational efficiency of the battery module assembly are greatly lowered when some of the battery cells suffer from overvoltage, overcurrent, or overheating. For this reason, means to sense and control such overvoltage, overcurrent, or overheating are needed. Consequently, voltage sensors, temperature sensors, etc. are connected to the respective battery cells to check and control operational states of the battery cells in real time or at predetermined intervals. Installation or connection of such sensing means and control means very complicate a process of assembling the battery module. Furthermore, a plurality of wires is needed to install or connect the sensing means and the control means with the result that a short circuit may occur in the battery module.

In particular, voltage sensing must be performed at electrical connection regions, such as series connection regions. As a result, a battery module or a battery module assembly manufactured by connecting a plurality of battery cells may have a very complicated structure as a whole.

Therefore, there is a high necessity for a battery module, the structure of which is compact, structural stability of which is high, and which is configured such that a sensing assembly can be efficiently assembled while solving the above problems.

In addition, there is a high necessity for a battery module assembly which can be configured using a plurality of battery modules with high assembly efficiency.

DISCLOSURE

Technical Problem

Therefore, the present invention has been made to solve the above problems and other technical problems that have yet to be resolved.

Specifically, it is an object of the present invention to provide a battery module having a compact structure, by which the battery module is stably installed in a limited space, such as a vehicle, while minimally occupying the space wherein a voltage sensing circuit unit is simply configured in addition to simple mechanical fastening and electrical connection.

Technical Solution

In accordance with one aspect of the present invention, the above and other objects can be accomplished by the provision of a battery module including (a) a unit cell assembly including two or more battery cells or unit modules connected to each other in parallel or in series, (b) a left case coupled to a left side of the unit cell assembly, the left case being provided at a left outer side thereof with a first fastening groove extending parallel to a longitudinal direction of the battery module such that a sensing assembly is fastened into the first fastening groove, the left case being provided at opposite ends thereof with second fastening grooves formed parallel to a height direction of the battery module, and (c) a right case coupled to a right side of the unit cell assembly, an external input and output terminal being oriented to a front of the battery module, the right case being provided at a right inner side thereof with a plurality of fixing grooves formed parallel to a longitudinal direction of the unit cell assembly such that the unit cell assembly is fastened and fixed into the fixing grooves.

The unit cell assembly is configured to have a structure in which two or more battery cells or unit modules connected to each other in series and the cases are coupled to the left side and the right side of the unit cell assembly. As a result, the external shape of the battery module is decided based on the external shape of the unit cell assembly.

For example, therefore, two or more plate-shaped battery cells are stacked or unit modules are stacked to constitute the rectangular battery module.

In the present invention, the terms "left side" and "right side" used to express positions or directions of the module case and the unit cell stack indicate relative positions or directions of the module case and the unit cell stack. For example, the above terms may indicate one side and the other side. Consequently, the terms "left side" and "right side" may be regarded as the terms "right side" and "left side" in the following description. All of these must be interpreted to be included in the category of the present invention.

In a preferred example, the left case may be provided at a front and a rear thereof with fastening holes for coupling the battery module formed in a lateral direction of the battery module.

In the same manner as the left case, the right case may be provided at a front and a rear thereof with fastening holes for coupling the battery module formed in the lateral direction of the battery module.

The left case may be provided at a left side thereof and the right case may be provided at a right side thereof with a plurality of through holes, through which a coolant is introduced into the unit cell assembly to cool the unit cell assembly and is then discharged from the battery module.

The left case may be provided at opposite ends thereof with insertion holes, through which one end of a sensing circuit unit electrically connected to the sensing assembly is coupled to the left case, thereby achieve easier installation of the sensing assembly and simplifying overall wiring.

According to circumstances, protective covers to protect the sensing assembly from external impact may be mounted to a top and opposite ends of the left case after the sensing assembly is mounted to the left case.

In a preferred example, the right case may be provided at a rear thereof, which is opposite to the front of the battery module at which the input and output terminal is formed, with a plate-shaped fixing part, to which a connector constituting the sensing circuit unit is mounted and fixed parallel to a ground or a horizontal plane.

In the above structure, the connector is prevent from being deviating from the normal position thereof and maintained in a stable coupling state by the fixing part when external impact is applied to the battery module. Consequently, a possibility of connector breakage is minimized.

The battery cells and the unit modules may be arranged parallel to the ground or the horizontal plane in a longitudinal direction and/or a height direction.

In a concrete example, the sensing assembly may be a member, to detect voltage of the battery cells or the unit modules constituting the battery module, configured to have a structure including (a) a pair of insulative support parts, each of which is configured in a hexahedral structure having a plurality of fastening parts formed in a shape corresponding to an electrical connection region between the two or more battery cells or unit modules such that the fastening parts are mounted to the electrical connection region in a male to female fastening fashion at the front of the battery module, at which the input and output terminal is formed, and a rear of the battery module, which is opposite to the front of the battery module, (b) a linear connection part, having one end electrically connected to the electrical connection region and the other end electrically connected to the sensing circuit unit, to electrically connect the fastening parts to each other, and (c) a conductive sensing part, having one end electrically connected to the connection part and the other end connected to the electrical connection region in a state in which the other end of the conductive sensing part is coupled in the fastening parts.

In the above structure, the connection part may include a plurality of wires.

In addition, the insulative support parts of the sensing assembly may be mounted to a series connection region of the rectangular battery module, thereby simplifying an electrical connection structure and an assembly process based thereupon, reducing the length of an electrical connection means to prevent increase of internal resistance, and reducing a possibility of connection means breakage due to external impact.

In the battery module including the sensing assembly according to the present invention, therefore, sensing circuits are prevented from being twisted during an assembly process. Consequently, additional time is not needed to arrange the sensing circuits after the assembly process is completed, thereby improving assembly efficiency.

Furthermore, the sensing assembly having the above structure maximally simplifies overall structure of a battery module assembly which may be very complicated due to a plurality of circuits for voltage detection and is easily mounted to or removed from the battery module. Consequently, time necessary for repair and replacement of the sensing assembly may be reduced.

Meanwhile, each of the unit modules may have various structures. A preferred example of the structure of each of the unit modules will hereinafter be described in detail.

For example, each of the unit modules may include two or more plate-shaped battery cells electrically connected to each other, each of the battery cells having electrode terminals formed at upper and lower ends thereof, respectively, the battery cells being electrically connected to each other in series or in parallel, and cell covers coupled to each other to cover outsides of the battery cells excluding electrode terminals. The number of battery cells constituting each of the unit modules may be 2 to 6.

Each of the plate-shaped battery cells is a battery cell having a small thickness and a relatively large width and length so as to minimize the overall size of a battery module when the battery cells are stacked to constitute the battery module.

In a preferred example, each of the battery cells may be a secondary battery configured to have a structure in which an electrode assembly is mounted in a battery case formed of a laminate sheet including a resin layer and a metal layer and electrode terminals protrude from the upper and lower ends of the battery case. Specifically, the electrode assembly may be mounted in a pouch-shaped case formed of an aluminum laminate sheet. The secondary battery with the above-described structure may also be referred to as a pouch-shaped battery cell.

Two or more of the battery cells may be covered by high-strength cell covers made of a synthetic resin or a metal material to constitute a unit module. The high-strength cell covers protect the battery cells exhibiting low mechanical strength and restrain the repetitive expansion and contraction fluctuation during the charge and discharge of the battery cells to prevent separation between sealed portions of the battery cells. Consequently, it is possible to manufacture a middle or large-sized battery module exhibiting higher safety.

The battery cells are connected to each other in series and/or in parallel within each of the unit modules or between neighboring unit modules. In a preferred example, the battery cells are arranged in series in a longitudinal direction so that electrode terminals of the battery cells are successively adjacent to each other, neighboring electrode terminals of the battery cells are coupled to each other, two or more of the battery cells are folded such that the battery cells are stacked, and a predetermined number of stacked battery cells are covered by the cell covers to manufacture a plurality of unit modules.

According to circumstances, two or more of the battery cells may be stacked, outsides of the stacked battery cells may be covered by the cell covers, and electrode terminals of the battery cells may be coupled to each other.

The coupling between the electrode terminals may be achieved using various methods, such as welding, soldering, and mechanical fastening. Preferably, the coupling between the electrode terminals is achieved by welding.

A plurality of battery cells or unit modules stacked with high density in a state in which electrode terminals of the battery cells or the unit modules are connected to each other may be mounted vertically, preferably, in a separable case including upper and lower parts configured to be coupled in an assembly type fastening structure to constitute the rectangular battery module.

The details of a unit module and a rectangular battery module manufactured using a plurality of unit modules are disclosed in Korean Patent Application No. 2006-45443, which has been filed in the name of the applicant of the present application and the disclosure of which is incorporated herein by reference.

In the above structure, the cell covers may include an upper cover and a lower cover, which are fastened to each other, and the upper cover and the lower cover may be provided at surfaces thereof with two or more protrusions formed parallel to the height direction of the battery module. In this case, the protrusions may define a flow channel, along which a coolant flow between the vertically stacked unit modules.

In accordance with another aspect of the present invention, there is provided a battery module assembly generally configured to have a hexahedral stack structure in which a plurality of rectangular battery modules, each of which includes two or more battery cells or unit modules connected to each other in series, is stacked by at least twos in a longitudinal direction (vertical direction) and/or a lateral direction (horizontal direction) thereof, wherein the rectangular battery modules are arranged parallel to a ground or a horizontal plane in the longitudinal direction thereof.

In accordance with another aspect of the present invention, there is provided a battery module assembly generally configured to have a hexahedral stack structure in which a plurality of rectangular battery modules, each of which includes two or more battery cells or unit modules connected to each other in series, is stacked by at least twos in a height direction or a lateral direction thereof, wherein a sensing assembly is mounted at a series connection region between the battery cells or the unit modules to voltage of the battery cells or the unit modules, one end of the voltage sensing assembly is connected to a sensing circuit unit to transmit sensed voltage to a controller, and the sensing circuit unit is configured to have an integrated circuit structure in which a plurality of branch circuits diverging from a stem circuit is integrated into the stem circuit to unify circuits connected to the controller.

That is, in the battery module assembly according to the present invention, a plurality of rectangular battery modules is stacked in the longitudinal direction and/or the lateral direction thereof to constitute a hexahedral stack structure. Consequently, the battery module assembly may have an overall compact and stable structure and, therefore, it is possible to solve a problem related to restriction in size of the battery module assembly when the battery module assembly is installed in a predetermined inner space of a vehicle.

In a preferred example, the hexahedral stack may be generally configured to have a regular hexahedral structure in which a plurality of rectangular battery modules is stacked by at least twos in the longitudinal direction and/or the lateral direction thereof.

Directions in the present invention are defined as follows. Based on three-dimensional x, y, and z axes as shown in FIG. 1, the stacked direction of the battery cells is defined as a lateral direction (z direction), the direction in which the external input and output terminal is located is defined as a longitudinal direction (y direction), and the other direction is defined as a height direction (x direction).

As previously described, in the battery module assembly according to the present invention, the rectangular battery modules are arranged such that the rectangular battery modules are parallel to the ground or the horizontal plane in the longitudinal direction thereof. As a result, the battery cells or the unit cells may be arranged while being vertically stacked in a state in which the battery cells or the unit cells are parallel to the ground or the horizontal plane. Consequently, the structure of each of the battery modules may enable easy installation of the battery module assembly even in a space having a restricted height as in a trunk of a vehicle.

In a preferred example, the hexahedral stack may be configured to have a structure in which at least two of the battery modules are stacked while being arranged opposite to each other in the longitudinal direction of the battery modules.

In the above description, "opposite arrangement" means that corresponding regions of two rectangular battery modules are arranged so as to face each other. For example, in a case in which each rectangular battery module is configured to have a structure in which an input and output terminal is located at one side of each rectangular battery module, the rectangular battery modules may be arranged such that the input and output terminals of the respective rectangular battery modules are adjacent to each other.

Such an opposite arrangement structure has an advantage of further simplifying a configuration for electrical connection.

Two or more of the battery modules may be arranged in the longitudinal direction and the lateral direction thereof and the battery modules are coupled to each other in the lateral direction thereof using long bolts, thereby achieving easy coupling between the battery modules.

Such a fastening structure using the long bolts prevents separation between the battery modules due to vertical vibration.

In a preferred example, each of the rectangular battery modules may be formed in the shape of a rectangular parallelepiped having a large height to width ratio. Consequently, it is possible to easily arrange the battery modules in the longitudinal direction and the lateral direction.

In another preferred example, the hexahedral stack may be generally configured to have a rectangular parallelepiped structure. Consequently, it is possible to configure a battery module assembly having a more compact structure.

In accordance with a further aspect of the present invention, there is provided a high-power, large-capacity battery pack including the battery module assembly as described above.

In consideration of the installation efficiency and the structural stability of the battery pack according to the present invention, the battery pack may be used as a power source for an electric vehicle, a hybrid electric vehicle, or a plug-in hybrid electric vehicle, which has a limited installation space and is exposed to frequent vibration and strong impact.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
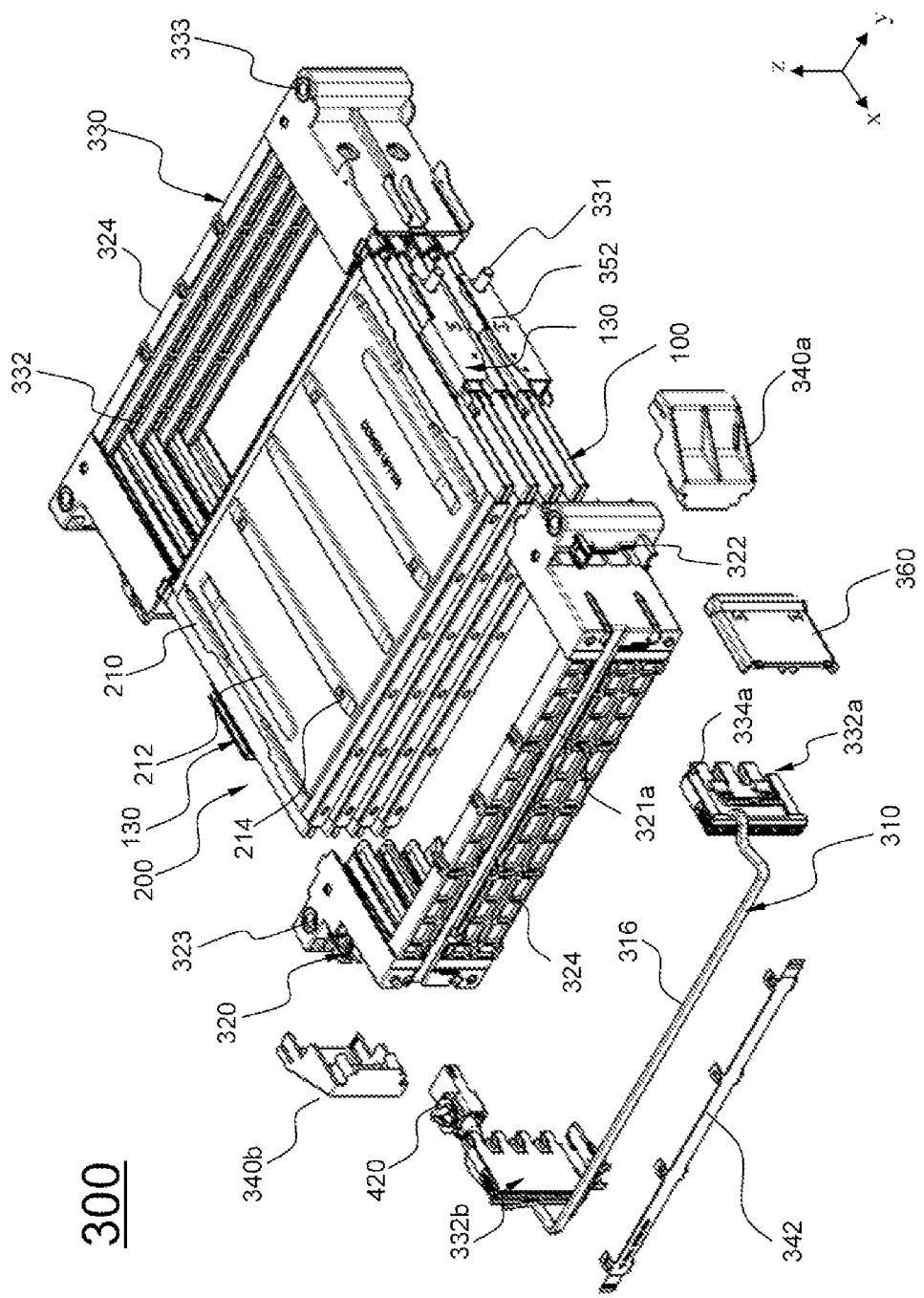
FIG. 1 is an exploded view showing a battery module according to an embodiment of the present invention.
Figure 2:
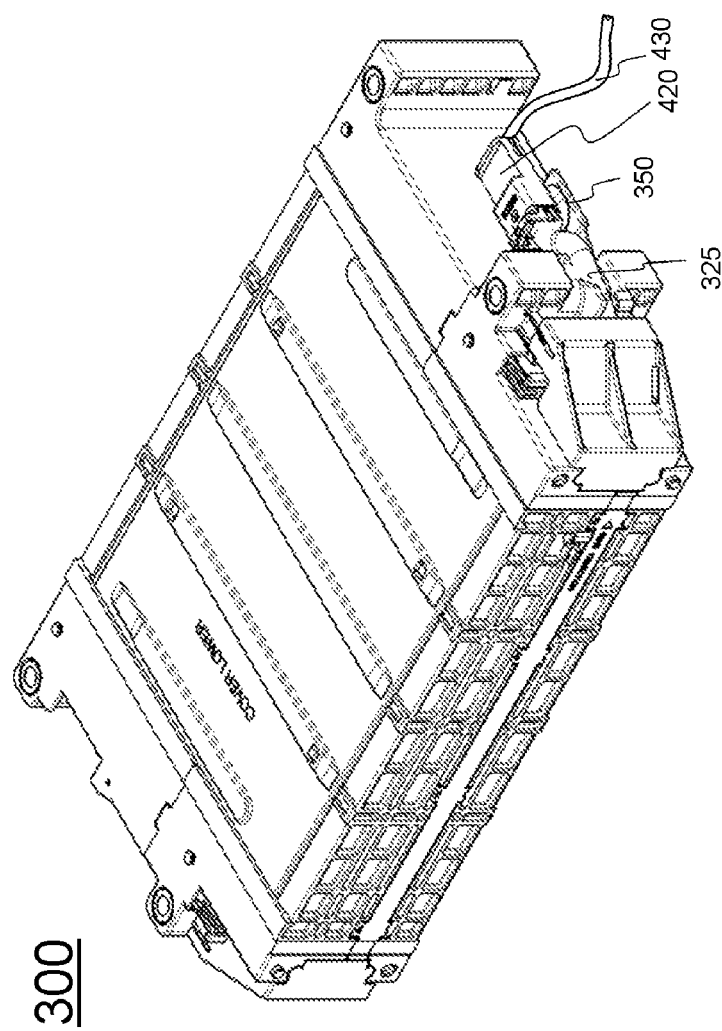
FIGS. 2 and 3 are perspective views of the battery module shown in FIG. 1.
Figure 3:
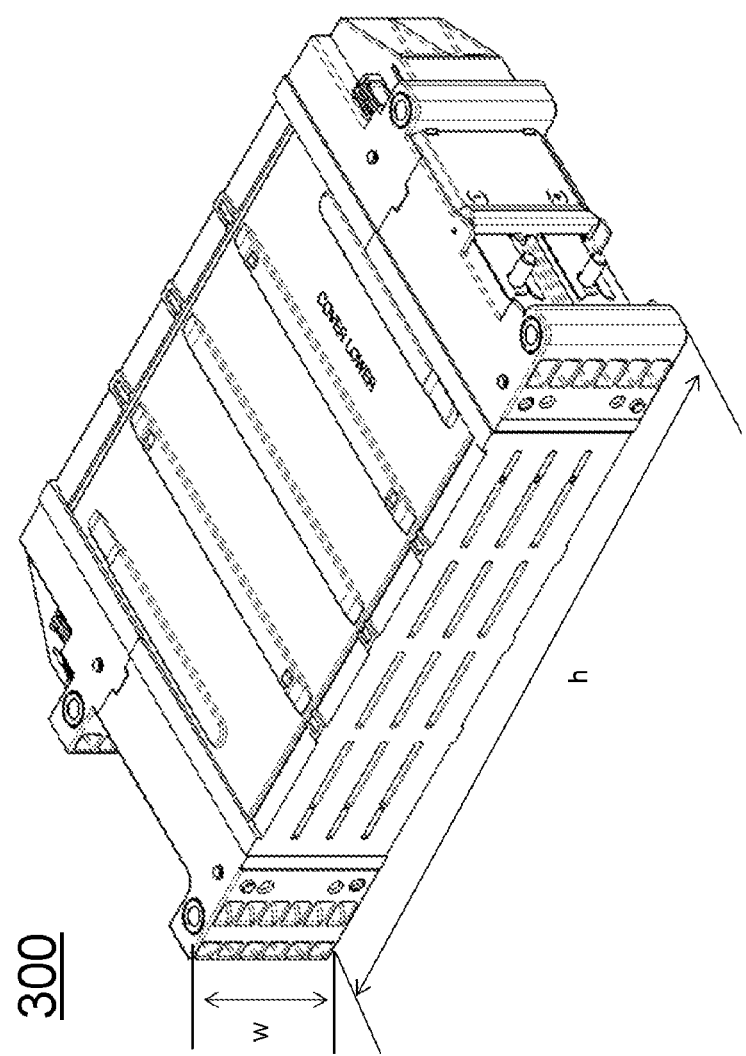
Figure 4:
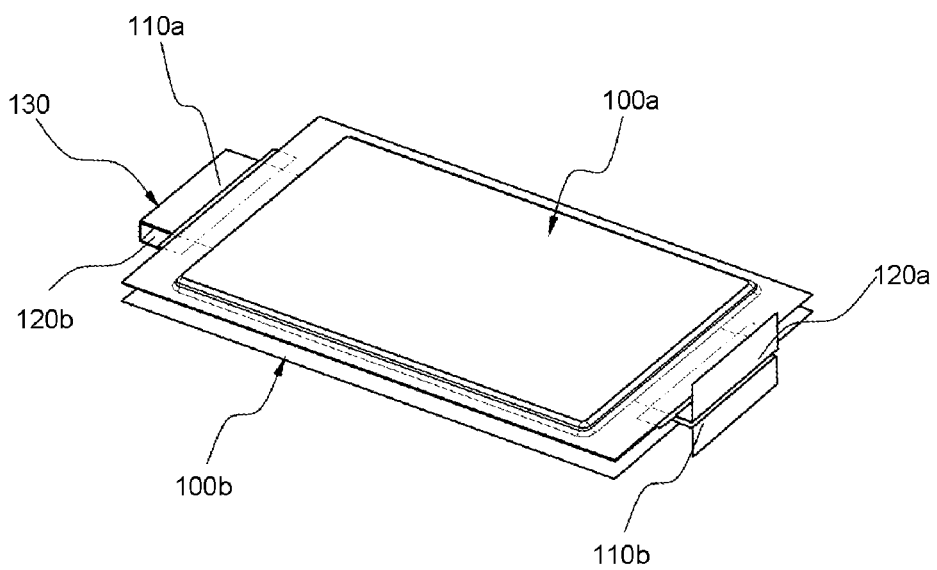
FIG. 4 is a typical view showing a state in which two battery cells are connected to each other in series.

FIG. 1 is an exploded view typically showing a battery module according to an embodiment of the present invention and FIGS. 2 and 3 are perspective views typically showing the battery module of FIG. 1. In addition, FIG. 4 is a typical view showing a state in which two battery cells are connected to each other in series.

Referring to these drawings, a unit cell assembly 200 of FIG. 1 includes four unit modules 100, each of which is configured to have a structure in which two battery cells 100*a* and 100*b* are connected to each other in series and are covered by high-strength cell covers 210 in a state in which electrode terminals 110a, 110b, 120a, and 120b are bent. The four unit modules 100 are connected to one another in series using a method of connecting a cathode terminal 110a of one battery cell 100a and an anode terminal 120b of another battery cell 100b to each other in series as shown in FIG. 4.

The cathode terminal 110a of the first battery cell 100a is bent downward and the anode terminal 120a of the first battery cell 100a is bent upward. The cathode terminal 110b of the second battery cell 100b is bent downward and the anode terminal 120b of the second battery cell 100b is bent upward.

Referring back to FIG. 1, a battery module 300 includes a unit cell assembly 200 including unit modules 100 electrically connected to each other in series, a left case 320 coupled to the left side of the unit cell assembly 200 in a direction facing the front of the battery module 300 at which an external input and output terminal 331 is located, and a right case 330 coupled to the right side of the unit cell assembly 200.

Meanwhile, the battery module 300 is formed in the shape of a rectangular parallelepiped having a large height h to width w ratio. The battery module 300 is arranged such that the battery module 300 is parallel to the ground in a longitudinal direction y and a lateral direction z.

The left case 320 is provided at a left side thereof with a first fastening groove 321a extending parallel to the longitudinal direction y of the battery module 300 such that a sensing assembly is fastened into the first fastening groove 321a. The left case 320 is provided at opposite ends thereof with second fastening grooves 322 formed parallel to a height direction x of the battery module 300.

The external input and output terminal 331 is oriented to the front of the battery module 300. The right case 330 is provided with a plurality of fixing grooves 332 formed parallel to the longitudinal direction y of the unit cell assembly 200 such that the unit cell assembly 200 is fastened and fixed into the fixing grooves 332.

In addition, the left case 320 is provided at the front and the rear thereof with fastening holes 323 for coupling the battery module 300 formed in the lateral direction z of the battery module 300 and the right case 330 is provided at the front and the rear thereof with fastening holes 333 for coupling the battery module 300 formed in the lateral direction z of the battery module 300.

A plurality of through holes 324 is formed at the left side of the left case 320 and the right side of the right case 330. Consequently, a coolant is introduced into the unit cell assembly 200 to cool the unit modules 100 and is then discharged from the battery module 300.

The left case 320 is provided at opposite ends thereof with insertion holes 325, through which one end of a sensing circuit unit 420 electrically connected to a sensing assembly 310 is coupled to the left case 320.

In addition, protective covers 340a, 340b, and 342 are mounted at the left side and the opposite ends of the left case 320 to protect the sensing assembly 310 from external impact. The right case 330 is provided at the rear thereof, which is opposite to the front of the battery module 300 at which the external input and output terminal 331 is formed, with a plate-shaped fixing part 350, to which a connector (not shown) constituting the sensing circuit unit 420 is mounted and fixed parallel to the ground.

The battery cells 100a and the unit modules 100 are arranged parallel to the ground in the height direction x and the longitudinal direction y.

The sensing assembly 310 is a member to detect voltage of the battery cells or the unit modules in the unit cell assembly 200 constituting the rectangular battery module 300. The sensing assembly 310 is configured to have a structure including a pair of insulative support parts 332a and 332b, each of which is generally configured in a hexahedral structure having a plurality of fastening parts 334a formed in a shape corresponding to a series connection region 130 between the battery cells or the unit modules such that the fastening parts 334a are mounted to the series connection region 130 in a male to female fastening fashion at the front of the battery module 300, at which the external input and output terminal 331 is formed, and the rear of the battery module 300, which is opposite to the front of the battery module 300, a linear connection part 316, having one end electrically connected to the series connection region 130 and the other end electrically connected to the sensing circuit unit 420, to electrically connect the fastening parts 334a to each other, and a conductive sensing part (not shown), having one end electrically connected to the connection part 316 and the other end electrically connected to the series connection region 130 in a state in which the other end of the conductive sensing part is coupled in the fastening parts 334a.

The protective covers 340a, 340b, and 342 are coupled to the top and the opposite ends of the left case 320 to protect the sensing assembly 310 from external impact after the sensing assembly 310 is coupled in the first coupling groove 321a and the second fastening grooves 322 of the left case 320. In addition, a protective cover 360 is coupled to the right case 330 to protect the external input and output terminal 331 from external impact after bus bars 352 are coupled to the external input and output terminal 331.

Each of the insulative support parts 332a and 332b is generally configured in a hexahedral structure having a plurality of pliers-shaped fastening parts 334a formed in a shape corresponding to a series connection region 130 between the unit modules 100 such that the fastening parts 334a are mounted at the series connection region 130 in a male to female fastening fashion at the front of the battery module 300, at which the external input and output terminal 331 is formed, and the rear of the battery module 300, which is opposite to the front of the battery module 300.

One end of the connection part 316 is electrically connected to the series connection region 130 and the other end of the connection part 316 is electrically connected to the sensing circuit unit 420. Consequently, the connection part 316 electrically connects the fastening parts 334a to each other. In addition, one end of the conductive sensing part is electrically connected to the connection part 316 and the other end of the conductive sensing part is electrically connected to the series connection region 130 in a receptacle fashion in a state in which the other end of the conductive sensing part is coupled in the fastening parts 334a.

Meanwhile, each unit module 100 includes two plate-shaped battery cells 100a and 100b connected to each other in series, each of the battery cells 100a and 100b having electrode terminals 110a and 120a formed at upper and lower ends thereof, respectively, the battery cells 100a and 100b being electrically connected to each other, and cell covers 210 coupled to each other to cover outsides of the battery cells 100a and 100b excluding electrode terminals 110a, 110b, 120a, and 120b.

In addition, the cell covers 210 include an upper cover and a lower cover, which are fastened to each other. The upper cover and the lower cover are provided at surfaces thereof with five protrusions 212 and 214 formed parallel to the height direction of the battery module. The protrusions 212 and 214 define a flow channel, along which a coolant flow between the stacked unit modules 100.

Figure 5:
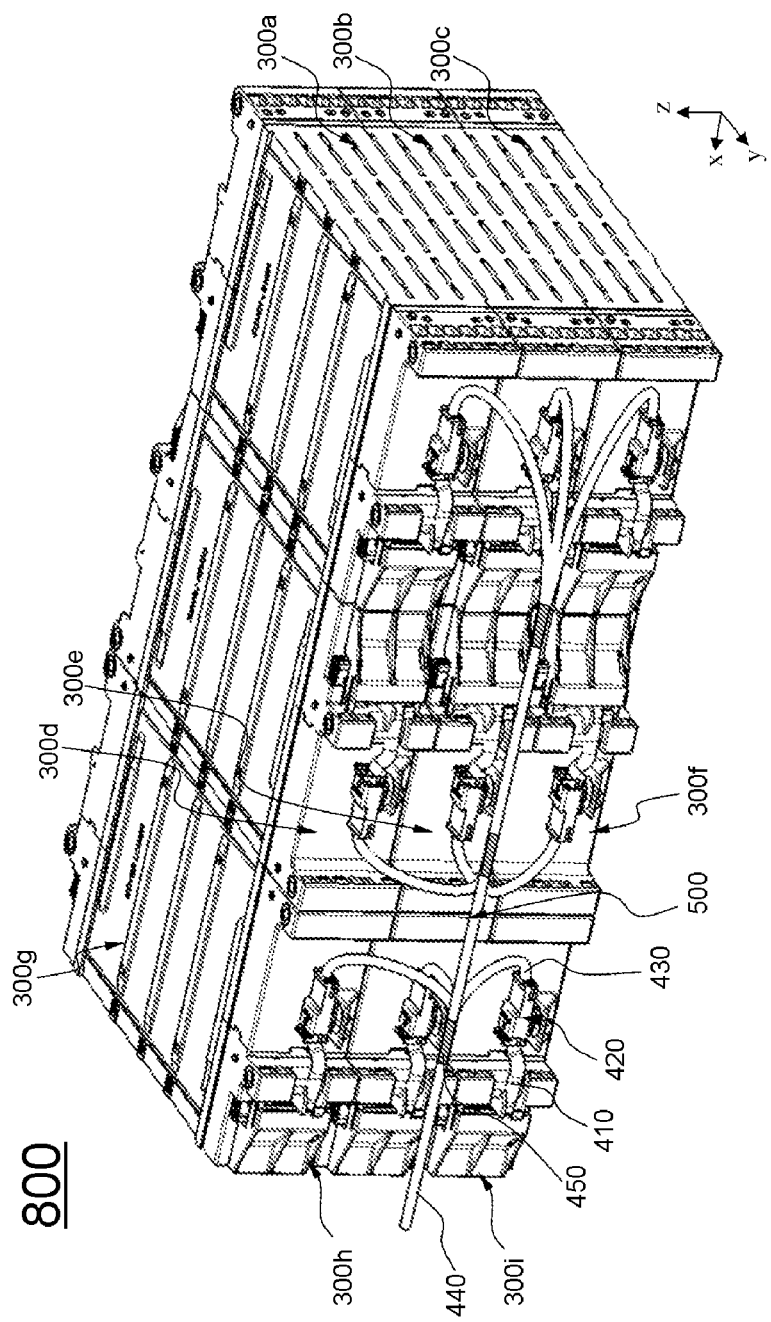
FIG. 5 is a perspective view showing a battery module assembly according to an embodiment of the present invention.
Figure 6:
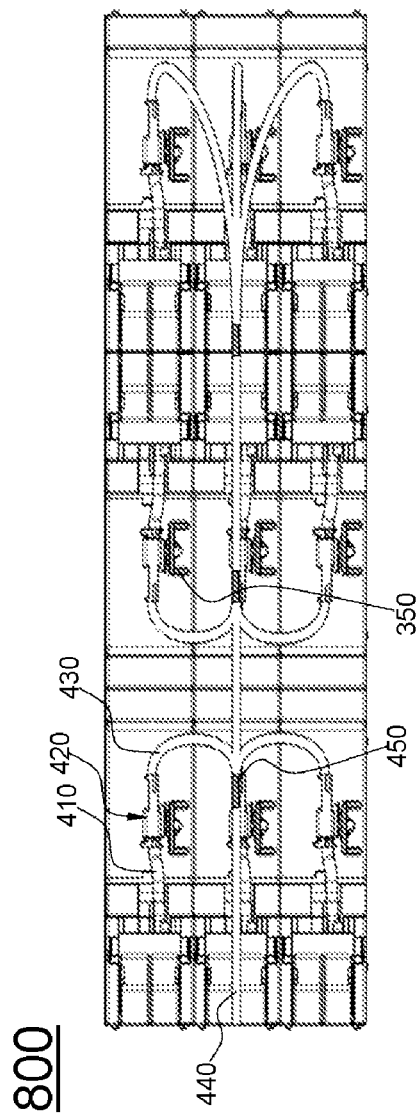
FIG. 6 is a front view of FIG. 5.

FIG. 5 is a perspective view typically showing a battery module assembly according to an embodiment of the present invention and FIG. 6 is a front view of FIG. 5.

Referring to FIGS. 5 and 6 together with FIG. 1, a battery module assembly 800 is configured to have a hexahedral stack structure in which nine rectangular battery modules 300a, 300b, 300c, 300d, 300e, 300f, 300g, 300h, and 300i are stacked by threes in a longitudinal direction x and a lateral direction z of the battery module assembly 800.

In the hexahedral stack structure, a first battery module group 300a, 300b, and 300c and a second battery module group 300d, 300e, and 300f are stacked while being arranged opposite to each other in the longitudinal direction x of the battery module assembly 800. Specifically, the battery modules 300a, 300b, 300c, 300d, 300e, and 300f are arranged such that portions of the battery modules 300a, 300b, 300c, 300d, 300e, and 300f at which input and output terminals are formed are adjacent to one another to constitute a rectangular parallelepiped structure.

That is, the input and output terminals are adjacent to one another at the fronts of the battery modules 300a, 300b, 300c, 300d, 300e, and 300f at which the input and output terminals are formed. In this structure, electrical connection among the battery modules 300a, 300b, 300c, 300d, 300e, and 300f and installation of a connection member 500 are simply achieved.

Sensing circuit units 420 are connected to a plurality of branch circuits diverging from a stem circuit 440. Each of the branch circuits is configured to have a structure including a first detection circuit 410 having one end electrically to a sensing assembly 310 and the other end fastened to a connector of a corresponding one of the sensing circuit units 420 in a receptacle fashion, a second detection circuit 430 having one end fastened to the connector of the corresponding one of the sensing circuit units 420 in a receptacle fashion and the other end integrated into the stem circuit 440, and a connector disposed between the first detection circuit 410 and the second detection circuit 430.

A left case 320 is provided at opposite ends thereof with insertion holes, through which one end of each sensing circuit unit 420 electrically connected to the sensing assembly 310 is coupled to the left case 320. A right case 330 is provided at the rear thereof, which is opposite to the front at which the input and output terminal is formed, with a plate-shaped fixing part 350, to which the connector of the sensing circuit unit 420 is mounted and fixed parallel to the ground or the horizontal plane. The stem circuit 440 is coupled to second detection circuits 430 corresponding to the respective sensing circuit units 420 using a band 450.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery module according to the present invention has a compact structure, by which the battery module may be stably installed in a limited space, such as a vehicle, while minimally occupying the space. In addition, structural stability of the battery module against external impact is improved. Furthermore, a voltage sensing wiring structure is simplified in addition to simple mechanical fastening and electrical connection, thereby improving assembly efficiency.

The invention claimed is:

1. A battery module comprising:
   (a) a unit cell assembly comprising two or more battery cells or unit modules connected to each other in parallel or in series;
   (b) a left case coupled to a left side of the unit cell assembly, the left case being provided at a left outer side thereof with a first fastening groove extending parallel to a longitudinal direction of the battery module such that a sensing assembly is fastened into the first fastening groove, the left case being provided at opposite ends thereof with second fastening grooves formed parallel to a height direction of the battery module such that the sensing assembly is coupled into the second fastening grooves; and
   (c) a right case coupled to a right side of the unit cell assembly, an external input and output terminal being oriented to a front of the battery module, the right case being provided at a right inner side thereof with a plurality of fixing grooves formed parallel to a longitudinal direction of the unit cell assembly such that the unit cell assembly is fastened and fixed into the fixing grooves,
   wherein the left case is provided at a front and a rear thereof with fastening holes for coupling adjacent battery modules formed in a lateral direction of said battery module,
   wherein the right case is provided at a front and a rear thereof with fastening holes for coupling adjacent battery modules formed in a lateral direction of said battery module,
   wherein the left case is provided at opposite ends thereof with insertion holes, through which one end of a sensing circuit unit electrically connected to the sensing assembly is coupled to the left case, and
   wherein the sensing circuit unit transmits sensed voltage to a controller.

2. The battery module according to claim 1, wherein the left case is provided at a left side thereof and the right case is provided at a right side thereof with a plurality of through holes, through which a coolant is introduced into the unit cell assembly to cool the unit cell assembly and is then discharged from the battery module.

3. The battery module according to claim 1, wherein the left case is further provided at a left side and opposite ends thereof with protective covers to protect the sensing assembly from external impact.

4. The battery module according to claim 1, wherein the right case is provided at a rear thereof, which is opposite to the front of the battery module at which the input and output terminal is formed, with a plate-shaped fixing part, to which a connector constituting the sensing circuit unit is mounted and fixed parallel to a ground or a horizontal plane.

5. The battery module according to claim 1, wherein the battery cells and the unit modules are arranged parallel to a ground or a horizontal plane in a longitudinal direction and/or a height direction.

6. The battery module according to claim 1, wherein the sensing assembly is a member, to detect voltage of the battery cells or the unit modules constituting the battery module, configured to have a structure comprising:
   (a) a pair of insulative support parts, each of which is configured in a hexahedral structure having a plurality of fastening parts formed in a shape corresponding to an electrical connection region between the two or more battery cells or unit modules such that the fastening parts are mounted to the electrical connection region in a male to female fastening fashion at the front of the battery module, at which the input and output terminal is formed, and a rear of the battery module, which is opposite to the front of the battery module;

(b) a linear connection part, having one end electrically connected to the electrical connection region and the other end electrically connected to the sensing circuit unit, to electrically connect the fastening parts to each other; and (c) a conductive sensing part, having one end electrically connected to the connection part and the other end connected to the electrical connection region in a state in which the other end of the conductive sensing part is coupled in the fastening parts.

7. The battery module according to claim 1, wherein each of the unit modules comprises two or more plate-shaped battery cells electrically connected to each other, each of the battery cells having electrode terminals formed at upper and lower ends thereof, respectively, the battery cells being electrically connected to each other in series or in parallel, and cell covers coupled to each other to cover outsides of the battery cells excluding electrode terminals.

8. The battery module according to claim 7, wherein the cell covers comprise an upper cover and a lower cover, which are fastened to each other, the upper cover and the lower cover being provided at surfaces thereof with two or more protrusions formed parallel to the height direction of the battery module.

9. The battery module according to claim 8, wherein the protrusions define a flow channel, along which a coolant flow between the stacked unit modules.

* * * * *